United States Patent
Itagaki

(10) Patent No.: US 10,029,699 B2
(45) Date of Patent: Jul. 24, 2018

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventor: Kenji Itagaki, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/205,192

(22) Filed: Jul. 8, 2016

(65) Prior Publication Data

US 2017/0008513 A1     Jan. 12, 2017

(30) Foreign Application Priority Data

Jul. 10, 2015 (JP) .................................. 2015-138575

(51) Int. Cl.
| | |
|---|---|
| B60W 50/08 | (2012.01) |
| B60W 10/06 | (2006.01) |
| B60W 10/08 | (2006.01) |
| B60W 30/192 | (2012.01) |
| B60W 20/10 | (2016.01) |

(52) U.S. Cl.
CPC .......... B60W 50/085 (2013.01); B60W 10/06 (2013.01); B60W 10/08 (2013.01); B60W 20/10 (2013.01); B60W 30/192 (2013.01); Y02T 10/6286 (2013.01); Y10S 903/902 (2013.01)

(58) Field of Classification Search
CPC .... B60W 50/085; B60W 20/10; B60W 10/06; B60W 30/192; B60W 10/08; Y02T 10/6286; Y10S 903/902
See application file for complete search history.

(56) References Cited

U.S. PATENT DOCUMENTS

2015/0291145 A1*  10/2015  Yu ........................ B60W 10/06
                                                                701/22

FOREIGN PATENT DOCUMENTS

| JP | 2009-280139 A | 12/2009 |
|---|---|---|
| JP | 2010-247585 A | 11/2010 |
| JP | 2013-001214 A | 1/2013 |
| JP | 2015-024774 A | 2/2015 |

\* cited by examiner

*Primary Examiner* — Mussa A Shaawat
*Assistant Examiner* — Michael V Kerrigan
(74) *Attorney, Agent, or Firm* — Hunton Andrews Kurth LLP

(57) ABSTRACT

A control apparatus is provided with: a setting device configured to set a surrounding environment situation in which a driver does not want to start the internal combustion engine, as an internal combustion engine start avoidance condition; an obtaining device configured to obtain surrounding environment situation information in order that the hybrid vehicle performs the autonomous running in the automatic operation mode; a condition determining device configured to determine whether or not the surrounding environment situation information matches the internal combustion engine start avoidance condition; and a controlling device configured to control the internal combustion engine to be more hardly started in a case where it is determined that the surrounding environment situation information matches the internal combustion engine start avoidance condition, than in a case where it is determined that the surrounding environment situation information does not match the internal combustion engine start avoidance condition.

5 Claims, 5 Drawing Sheets

CONTROL APPARATUS FOR HYBRID VEHICLE

CROSS-REFERENCE TO RELATED APPLICATIONS

This application is based upon and claims the benefit of priority of the prior Japanese Patent Application No. 2015-138575, filed on Jul. 10, 2015, the entire contents of which are incorporated herein by reference.

BACKGROUND OF THE INVENTION

1. Field of the Invention

Embodiments of the present invention relate to a control apparatus for a hybrid vehicle that allows automatic operation.

2. Description of the Related Art

For this type of apparatus, there is known an apparatus configured to determine an optimal running mode in a hybrid vehicle in automatic operation. For example, Japanese Patent Application Laid Open No. 2013-001214 discloses an apparatus configured to determine whether or not to start an internal combustion engine (i.e. whether to operate the internal combustion engine to run in a HV mode, or to stop the internal combustion engine to run in an EV mode), on the basis of an amount of energy required from a current place to a destination.

A driver sometimes does not want to start the internal combustion engine (i.e. wants to keep running in the EV mode with the internal combustion engine stopped) depending on a surrounding environment of the vehicle. Most drivers do not want to start the internal combustion engine in order to avoid making an operation sound of the internal combustion engine, for example, if there are pedestrians in the surroundings of the vehicle, if the vehicle runs at a low speed around the driver's house in the middle of the night, if the vehicle runs in a building, or in similar cases.

If the vehicle performs the automatic operation, however, the internal combustion engine is sometimes automatically started, depending on a running condition of the vehicle or the like. Thus, even if the driver does not want to start the internal combustion engine, there is a possibility that the internal combustion engine is started against the driver's intention. Such a situation is not preferable from the viewpoint of drivability and from the viewpoint of noise to the surroundings.

SUMMARY

In view of the aforementioned problems, it is therefore an object of embodiments of the present invention to provide a control apparatus for a hybrid vehicle, configured to preferably control the start of the internal combustion engine in automatic operation.

The above object of embodiments of the present invention can be achieved by a control apparatus for a hybrid vehicle wherein the hybrid vehicle includes an internal combustion engine and an electric motor as a power source, and the hybrid vehicle can realize an automatic operation mode that allows autonomous running without any input by a driver, the control apparatus provide with: a setting device configured to set a surrounding environment situation in which the driver does not want to start the internal combustion engine, as an internal combustion engine start avoidance condition in advance; an obtaining device configured to obtain surrounding environment situation information in order that the hybrid vehicle performs the autonomous running in the automatic operation mode; a condition determining device configured to determine whether or not the surrounding environment situation information obtained by the obtaining device matches the internal combustion engine start avoidance condition set by the setting device; and a controlling device configured to control the internal combustion engine to be more hardly started in a case where it is determined that the surrounding environment situation information matches the internal combustion engine start avoidance condition, than in a case where it is determined that the surrounding environment situation information does not match the internal combustion engine start avoidance condition.

The hybrid vehicle according to embodiments of the present invention is a vehicle that includes, as the main power source: the internal combustion engine, which is configured, for example, as a gasoline engine and a diesel engine; and the electric motor, which is configured, for example, as a motor generator. Moreover, particularly, the hybrid vehicle according to embodiments of the present invention can realize the automatic operation mode that allows the autonomous running without any input by the driver. In the automatic operation mode, running control of the vehicle is automatically performed on the basis of information obtained from, for example, various sensors, an in-vehicle camera, a global positioning system (GPS), and the like.

The control apparatus for the hybrid vehicle according to embodiments of the present invention is an apparatus configured to control the vehicle in the aforementioned automatic operation mode, and can adopt forms of various computer systems or the like, such as various controllers or microcomputer apparatuses, and various processing units like a single or a plurality of electronic control units (ECUs), which can include, if necessary, for example, one or a plurality of central processing units (CPUs), micro processing units (MPUs), various processors or various controllers, and various storing devices, such as a read only memory (ROM), a random access memory (RAM), a buffer memory, and a flash memory.

In the control apparatus for the hybrid vehicle according to embodiments of the present invention, the internal combustion engine start avoidance condition is set by the setting device in advance (e.g. before the vehicle starts to run). The "internal combustion engine start avoidance condition" herein is a condition regarding the surrounding environment situation in which the driver does not want to start the internal combustion engine, and various conditions can be set, such as, for example, presence of pedestrians, a place, and a time zone. The driver uses, for example, an operation panel provided for the hybrid vehicle, thereby setting the internal combustion engine start avoidance condition. There may be also set, for example, a plurality of internal combustion engine start avoidance conditions.

When the hybrid vehicle runs in the automatic operation mode, the surrounding environment situation information for performing the autonomous running is obtained by the obtaining device. Specific examples of the surrounding environment situation information can include, for example, map data, a position and a direction of an own vehicle, presence of obstacles, and the like. The type of the surrounding environment situation information is not limited as long as it can be used for the hybrid vehicle to perform the autonomous running. Information other than the aforementioned specific examples may be obtained as the surrounding environment situation information.

The surrounding environment situation information obtained by the obtaining device is used not only for the autonomous running of the hybrid vehicle, but also for the determination performed by the condition determining device. On the condition determining device, it is determined whether or not the obtained surrounding environment situation information matches the internal combustion engine start avoidance condition set by the setting device. More specifically, on the condition determining device, it is determined whether or not a current surrounding environment situation of the vehicle matches the surrounding environment situation set in advance in which the driver does not want to start the internal combustion engine. The term "match" herein does not require that the surrounding environment situations are completely the same, but may mean that the surrounding environment situations are similar to each other.

Then, the controlling device performs the control according to a determination result of the condition determining device. Specifically, if it is determined that the obtained surrounding environment situation information matches the internal combustion engine start avoidance condition, the internal combustion engine is controlled to be more hardly started than in the case where it is determined that the obtained surrounding environment situation information does not match the internal combustion engine start avoidance condition. Thus, even in a situation in which the internal combustion engine is normally automatically started, if the obtained surrounding environment situation information matches the internal combustion engine start avoidance condition, then, the internal combustion engine is not automatically started.

Particularly, in embodiments of the present invention, whether or not the current surrounding environment situation of the vehicle matches the internal combustion engine start avoidance condition is determined on the basis of the surrounding environment situation information for the hybrid vehicle performing the autonomous running. Thus, even without separately obtaining information regarding the surrounding environment situation of the hybrid vehicle, the information used for the autonomous running can be used to perform the determination. Moreover, the surrounding environment situation information for the hybrid vehicle performing the autonomous running has a relatively large information amount due to its nature, and has extremely high accuracy. It is thus possible to obtain an accurate determination result, regarding whether or not the current surrounding environment situation of the vehicle matches the internal combustion engine start avoidance condition.

As explained above, according to the control apparatus for the hybrid vehicle of embodiments of the present invention, it is possible to preferably control the start of the internal combustion engine in automatic operation.

In one aspect of the control apparatus for the hybrid vehicle according to embodiments of the present invention, wherein the setting device can set presence of pedestrians in surroundings of the hybrid vehicle, as the internal combustion engine start avoidance condition, and the obtaining device detects pedestrians in the surroundings of the hybrid vehicle by comparing the surrounding environment situation information stored in advance and the surrounding environment situation information at a current time, and obtains a detection result as the surrounding environment situation information.

According to this aspect, the number of the pedestrians who are in the surroundings of the hybrid vehicle and distances to the pedestrians or the like can be set as the internal combustion engine start avoidance condition. For example, the driver can set a situation in which there are Y pedestrians in a range of X meters from the hybrid vehicle as the internal combustion engine start avoidance condition, wherein X and Y are numerical values that can be arbitrarily changed.

On the other hand, during running of the hybrid vehicle, the surrounding environment situation information stored in advance and the surrounding environment situation information at the current time are compared, and as a result, the pedestrians in the surroundings of the hybrid vehicle are detected. The "surrounding environment situation information stored in advance" herein is surrounding environment situation information that can be obtained before the vehicle starts to run, and is information stored in advance in a storage medium, a server, or the like, for example, as the map data. Moreover, the "surrounding environment situation information at the current time" is surrounding environment situation information that is obtained in a state in which the vehicle is actually running, and is obtained, for example, by a camera, various sensors, or the like.

The surrounding environment situation information stored in advance does not include information on obstacles, such as pedestrians, which change at each time. On the other hand, the surrounding environment situation information at the current time includes the information on obstacles, such as pedestrians. Thus, by comparing the surrounding environment situation information stored in advance and the surrounding environment situation information at the current time (specifically, by calculating a difference between data), the information on the obstacles such as the pedestrians can be detected. Then, if an obstacle having a size of a human and having a behavior similar to a human's behavior is extracted from the detected obstacles, the pedestrian can be accurately detected.

It is determined whether or not the information on the pedestrians obtained as the surrounding environment situation information matches the internal combustion engine start avoidance condition set in advance. If it is determined that the obtained information on the pedestrians matches the internal combustion engine start avoidance condition, the internal combustion is controlled to be hardly started. By virtue of such control, the start of the internal combustion engine can be preferably suppressed, for example, if there are many pedestrians in the surroundings of the hybrid vehicle and the driver does not want to make an operation sound of the internal combustion engine.

In another aspect of the control apparatus for the hybrid vehicle according to embodiments of the present invention, wherein the setting device can set a particular place, as the internal combustion engine start avoidance condition, and the obtaining device obtains a place in which the hybrid vehicle is running, as the surrounding environment situation information.

According to this aspect, the particular place in which the hybrid vehicle possibly runs can be set as the internal combustion engine start avoidance condition. For example, the driver can set the internal combustion engine start avoidance condition by inputting coordinates indicating the particular place. The "particular place" may be not only a pin-point place but also an area with a certain degree of range (e.g. an area in a range of X meters from the particular place, etc.).

During running of the hybrid vehicle, information on the place in which the hybrid vehicle is running is obtained as the surrounding environment situation information. It is then determined whether or not the information indicating the place obtained as the surrounding environment situation information matches the particular place set in advance as the internal combustion engine start avoidance condition. As a result, if the place in which the hybrid vehicle is running matches the internal combustion engine start avoidance condition, the internal combustion engine is controlled to be hardly started. By virtue of such control, the start of the internal combustion engine can be preferably suppressed, for example, if the hybrid vehicle is running around the driver's house or in a building or the like and the driver does not want to make an operation sound of the internal combustion engine.

In another aspect of the control apparatus for the hybrid vehicle according to embodiments of the present invention, wherein the setting device can set a time zone, as the internal combustion engine start avoidance condition, and the obtaining device obtains a current time, as the surrounding environment situation information.

According to this aspect, the time zone in which the hybrid vehicle runs can be set as the internal combustion engine start avoidance condition. For example, the driver can set the internal combustion engine start avoidance condition by specifying a start time and an end time of a time zone in which the driver does not want to start the internal combustion engine.

During running of the hybrid vehicle, information indicating the current time is obtained as the surrounding environment situation information. It is then determined whether or not the information indicating the current time obtained as the surrounding environment situation information matches the time zone set in advance as the internal combustion engine start avoidance condition. As a result, if the current time matches the internal combustion engine start avoidance condition, the internal combustion engine is controlled to be hardly started. By virtue of such control, the start of the internal combustion engine can be preferably suppressed, for example, if the hybrid vehicle is running late at night or early in the morning and the driver does not want to make an operation sound of the internal combustion engine.

In another aspect of the control apparatus for the hybrid vehicle according to embodiments of the present invention, wherein the setting device can set a road width, as the internal combustion engine start avoidance condition, and the obtaining device obtains a road width of a road on which the hybrid vehicle is running, as the surrounding environment situation information.

According to this aspect, the road width of the road on which the hybrid vehicle runs can be set as the internal combustion engine start avoidance condition. For example, the driver can set the internal combustion engine start avoidance condition by specifying a range of the road width according to an environment in which the driver does not want to start the internal combustion engine.

During running of the hybrid vehicle, information on the road width of a road on which the hybrid vehicle is running is obtained as the surrounding environment situation information. It is then determined whether or not the information on the road width obtained as the surrounding environment situation information matches the road width set in advance as the internal combustion engine start avoidance condition. As a result, if the road width of the road on which the hybrid vehicle is running matches the internal combustion engine start avoidance condition, the internal combustion engine is controlled to be hardly started. By virtue of such control, the start of the internal combustion engine can be preferably suppressed, for example, if the hybrid vehicle is running in a residential area with a narrow road or the like and the driver does not want to make an operation sound of the internal combustion engine.

The information on the pedestrians, the place, the time zone, and the road width explained in various aspects described above can be combined with each other, and can be set as the surrounding environment situation information. This makes it possible to set a more complicated condition, such as, for example, in a case where the hybrid vehicle runs around the driver's house early in the morning.

In another aspect of the control apparatus for the hybrid vehicle according to embodiments of the present invention, wherein the control apparatus comprises a start determining device configured to determine whether or not to start the internal combustion engine, in accordance with whether a predetermined parameter of the hybrid vehicle exceeds a determination threshold value, and the controlling device controls said start determining device (i) to use a first threshold value as the determination threshold value if it is determined that the surrounding environment situation information obtained by the obtaining device does not match the internal combustion engine start avoidance condition, and (ii) to use a second threshold value, which causes the internal combustion engine to be more hardly started than using the first threshold value, as the determination threshold value, if it is determined that the surrounding environment situation information obtained by the obtaining device matches the internal combustion engine start avoidance condition.

According to this aspect, whether or not to start the internal combustion engine in the automatic operation mode (i.e. whether to start the internal combustion engine to perform HV running, or to keep EV running with the internal combustion engine stopped) is determined by the start determining device. The start determining device determines whether or not to start the internal combustion engine, in accordance with the predetermined parameter of the hybrid vehicle exceeds the determination threshold value.

The "predetermined parameter" herein is a parameter that allows determination of a detrimental effect caused by not starting the internal combustion engine. For example, a parameter regarding a lubricating requirement of a transaxle, a parameter regarding a heating requirement, or the like can be listed. Moreover, the "determination threshold value" is a threshold value for determining whether or not the predetermined parameter is high enough to cause the aforementioned detrimental effect. For example, a value is set at which simulations performed in advance or the like show a possibility of the determination threshold value at a certain level or higher. In this aspect, as described later, at least two types of determination threshold values are set.

In this aspect, if it is determined that the surrounding environment situation information obtained by the obtaining device does not match the internal combustion engine start avoidance condition (i.e. if it is not necessary to suppress the start of the internal combustion engine), the first threshold value is used as the determination threshold value of the start determining device. On the other hand, if it is determined that the surrounding environment situation information obtained by the obtaining device matches the internal combustion engine start avoidance condition (i.e. if it is necessary to suppress the start of the internal combustion engine), the second threshold value, which causes the internal combustion engine to be more hardly started than using the first threshold value, is used as the determination threshold value of the start determining device.

By using the two determination threshold values as described above, the start of the internal combustion engine can be more preferably controlled. Specifically, if the first threshold value is set as a recommended value in which not starting the internal combustion engine may cause the detrimental effect even though it is less likely, and if the second threshold value is set as a required value in which not starting the internal combustion engine highly likely causes the detrimental effect, it is then possible to suppress the start of the internal combustion engine while efficiently avoiding the detrimental effect.

In the aspect in which the start determining device is provided, wherein the start determining device determines whether or not to start the internal combustion engine by using as the predetermined parameter a period or a distance in which the hybrid vehicle runs with the internal combustion engine stopped, in order to lubricate lubricant oil of a transaxle of the hybrid vehicle.

Some hybrid vehicle has a mechanism in which the lubricant oil of the transaxle is possibility lubricated only if the internal combustion engine is operated. In such a hybrid vehicle, if the internal combustion engine is not started over a long time or a long distance, a lubricating function of the transaxle is reduced, which possibly causes an unexpected detrimental effect.

In this aspect, however, the period or the distance in which the hybrid vehicle runs with the internal combustion engine stopped is set as the predetermined parameter. Thus, if the surrounding environment situation information does not match the internal combustion engine start avoidance condition, the internal combustion engine is started when the period or the distance in which the hybrid vehicle runs with the internal combustion engine stopped exceeds the first threshold value. Moreover, even if the surrounding environment situation information matches the internal combustion engine start avoidance condition, the internal combustion engine is started when the period or the distance in which the hybrid vehicle runs with the internal combustion engine stopped exceeds the second threshold value. It is therefore possible to preferably suppress the detrimental effect regarding the lubricant oil of the transaxle while suppressing the start of the internal combustion engine.

Alternatively, in the aspect in which the start determining device is provided, wherein the start determining device determines whether or not to start the internal combustion engine by using as the predetermined parameter a heat quantity required for a heater of the hybrid vehicle.

Some hybrid vehicle uses an exhaust heat of the internal combustion engine as a heat source of the heater in a vehicle interior. In such a hybrid vehicle, if the internal combustion engine is not started, the heat quantity that satisfies the heating requirement is not obtained, which possibly causes an unexpected detrimental effect.

In this aspect, however, the heat quantity required for the heater of the hybrid vehicle is set as the predetermined parameter. Thus, if the surrounding environment situation information does not match the internal combustion engine start avoidance condition, the internal combustion engine is started when the heat quantity required for the heater of the hybrid vehicle exceeds the first threshold value. Moreover, even if the surrounding environment situation information matches the internal combustion engine start avoidance condition, the internal combustion engine is started when the heat quantity required for the heater of the hybrid vehicle exceeds the second threshold value. It is therefore possible to preferably suppress the detrimental effect regarding the heating requirement while suppressing the start of the internal combustion engine.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

Hereinafter, a control apparatus for a hybrid vehicle according to an embodiment of the present invention will be explained with reference to the drawings.

<Configuration of Hybrid Vehicle>

Figure 1:
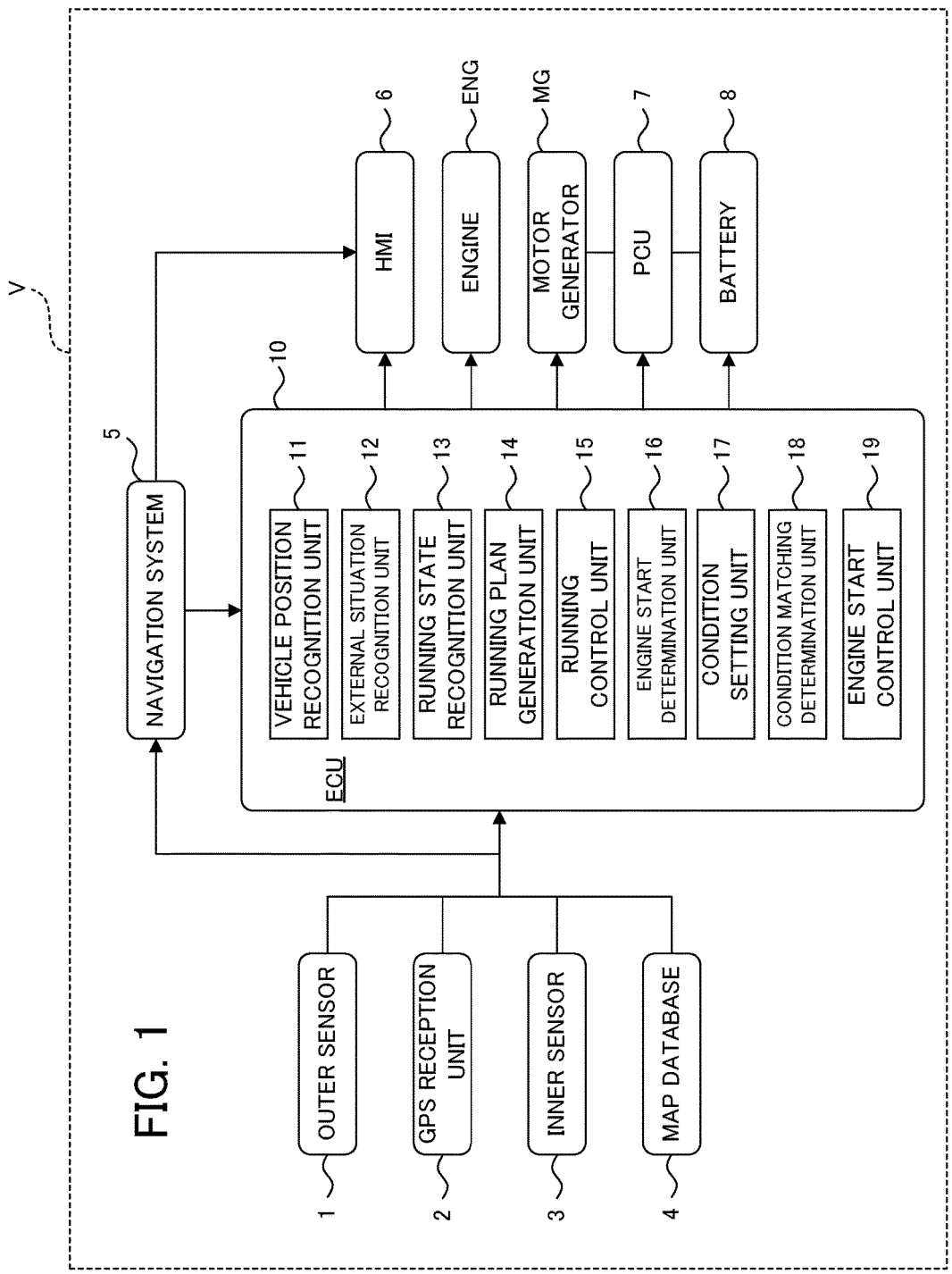
FIG. 1 is a block diagram illustrating a configuration of a vehicle according to an embodiment.

Firstly, with reference to FIG. 1, a configuration of a hybrid vehicle V according to the embodiment will be explained. FIG. 1 is a schematic block diagram illustrating the configuration of the hybrid vehicle according to the embodiment.

As illustrated in FIG. 1, the hybrid vehicle V according to the embodiment is provided with an engine ENG and a motor generator MG, which are power sources, an outer sensor 1, a GPS reception unit 2, an inner sensor 3, a map database 4, a navigation system 5, a human machine interface (HMI) 6, a power control unit (PCU) 7, a battery 8, and an electronic control unit (ECU) 10.

The engine ENG is a main power source of the hybrid vehicle V, and is driven by burning fuel, such as gasoline and light oil. Moreover, the engine ENG can also function as a power source for rotating (i.e. driving) a rotating shaft of the motor generator MG described later. The engine ENG is one specific example of the "internal combustion engine".

The motor generator MG functions as a power source of the hybrid vehicle V together with the engine ENG. The motor generator MG is coupled with the engine ENG via a not-illustrated power dividing mechanism (e.g. a planetary gear mechanism). The motor generator MG also has a regeneration function for converting a driving force of the hybrid vehicle V to electric power. The motor generator MG is configured to input/output electric power to/from the battery 8 via the PCU 7.

The outer sensor 1 is a detection device configured to detect an external situation, which is information on surroundings of the hybrid vehicle V. The outer sensor 1 includes, for example, a camera, a radar, a laser imaging detection and ranging (LIDER), and the like. Information detected by the outer sensor 1 is outputted to the ECU 10.

The GPS reception unit 2 receives a signal from a GPS satellite, thereby measuring a position of the hybrid vehicle V (e.g. latitude and longitude of the vehicle V). The GPS reception unit 2 transmits information on the measured position of the hybrid vehicle V, to the ECU 10. Instead of the GPS reception unit 2, another device that can specify the position of the hybrid vehicle V can be also used. The GPS reception unit 2 can also measure a direction of the hybrid vehicle V if the GPS reception unit 2 has a plurality of antennas that receive signals from the GPS satellite.

The inner sensor 3 is a detection device configured to detect a running state of the hybrid vehicle V. The inner sensor 3 includes, for example, a vehicle speed sensor, an acceleration sensor, a yaw rate sensor, and the like. Information detected by the inner sensor 3 is outputted to the ECU 10.

The map database 4 is a database with map information. The map database 4 is formed, for example, in a hard disk drive (HDD) mounted on the hybrid vehicle V. The map information includes, for example, information on a position of a road, information on a road shape (e.g. a type of a curve or a straight line, a curvature of a curve, etc.), information on an intersection and a junction, and the like. Moreover, in order to use information on a position of a blocking structure such as a building and a wall, and a simultaneous localization and mapping (SLAM) technique, the map information preferably includes an output signal of the outer sensor 1. The map database 4 may be stored in a computer at a facility, such as an information processing center, that can communicate with the hybrid vehicle V.

The navigation system 5 is an apparatus configured to guide a driver of the hybrid vehicle V to a destination set by the driver of the hybrid vehicle V. The navigation system 5 calculates a route on which the hybrid vehicle V runs, on the basis of the information on the position of the vehicle V measured by the GPS reception unit 2 and the map information from the map database 4. The route may be obtained by specifying a preferable lane in a section of a plurality of lanes. The navigation system 5, for example, arithmetically operates a target route from the position of the hybrid vehicle V to the destination, and reports the target route to the driver by displaying it on a display with an audio output of a speaker. The navigation system 5, for example, transmits information on the target route of the hybrid vehicle V to the ECU 10. The navigation system 5 may be stored in a computer at a facility, such as an information processing center, that can communicate with the hybrid vehicle V.

The HMI 6 is an interface for outputting and inputting information between an occupant (including the driver) of the hybrid vehicle V and a control apparatus for the hybrid vehicle. The HMI 6 is provided, for example, with a display panel for displaying image information to the occupant, a speaker for outputting audio, an operation button or a touch panel for the occupant performing an input operation, and the like. The HMI 6 outputs a signal to the ECU 10 when the input operation associated with operation or stop of automatic running is performed by the occupant, and the HMI 6 starts or stops the automatic running. The HMI 6 notifies the occupant of arrival at the destination in arriving at the destination in which the automatic running is ended. The HMI 6 may use a wirelessly connected portable information terminal to output the information to the occupant, or may use the portable information terminal to receive the input operation.

The PCU 7 is a unit configured to control the input/output of the electric power between the battery 8 and the motor generator MG. The PCU 7 is provided, for example, with: an inverter configured to convert direct current (DC) power extracted from the battery 8 to alternating current (AC) power and supply it to the motor generator MG and configured to convert AC power generated by the motor generator MG to DC power and supply it to the battery 8; a converter configured to raise or lower voltage of the electric power; a SMR configured to conduct or cut off electric power transmission; and the like.

The battery 8 is configured as a power supply configured to charge, such as, for example, a lithium ion battery. The battery 8 is an electric power supply configured to supply the motor generator MG with electric power for driving the motor generator MG. The battery 8 can be also charged with the electric power for driving the motor generator MG. The battery 8 may be also charged by receiving supply of an electric power, from an external power supply of the hybrid vehicle V. In other words, the hybrid vehicle V may be a so-called plug-in hybrid vehicle.

The ECU 10 is one specific example of the "control apparatus for the hybrid vehicle", and is an electronic control unit configured to control an entire operation of the hybrid vehicle V. Particularly, the ECU 10 according to the embodiment is configured to perform an engine start inhibition control process in automatic operation of the hybrid vehicle V by using a logical or physical processing block realized inside the ECU 10. A specific configuration of the ECU 10 will be detailed below.

<Configuration of ECU>

As illustrated in FIG. 1, the ECU 10 is provided with a vehicle position recognition unit 11, an external situation recognition unit 12, a running state recognition unit 13, a running plan generation unit 14, a running control unit 15, an engine start determination unit 16, a condition setting unit 17, a condition matching determination unit 18, and an engine start control unit 19.

The vehicle position recognition unit 11 recognizes a position of the hybrid vehicle V on a map (hereinafter referred to as a "vehicle position" as occasion demands), on the basis of the information on the position of the hybrid vehicle V received by the GPS reception unit 2 and the map information from the map database 4. The vehicle position recognition unit 11 may obtain and recognize the vehicle position used for the navigation system 5, from the navigation system 5. If the vehicle position of the hybrid vehicle V is measured by a sensor placed in the exterior, such as on a road, the vehicle position recognition unit 11 may obtain the vehicle position from the sensor by communication.

The external situation recognition unit 12 recognizes an external situation recognizes the external situation of the hybrid vehicle V, on the basis of a detection of the outer sensor 1 (e.g. imaging information from the camera, obstacle information from the radar or the LIDER, etc.). The external situation includes, for example, a position of a white line of a running lane with respect to the hybrid vehicle V or a position of a lane center and a road width, a road shape (e.g. a curvature of a running lane, a slope change of a road surface effective for prospect estimation of the outer sensor 1, undulation, etc.), and a situation of obstacles in the surrounding of the hybrid vehicle V (e.g. information for differentiating a fixed obstacle and a moving obstacle, positions of the obstacles with respect to the hybrid vehicle V, moving directions of the obstacles with respect to the hybrid vehicle V, relative speeds of the obstacles with respect to the hybrid vehicle V, etc.). Moreover, collation of a detection result of the outer sensor 1 and the map information may compensate for accuracy of the position and direction of the hybrid vehicle V obtained by the GPS reception unit 2.

The running state recognition unit 13 recognizes a running state of the hybrid vehicle V, on the basis of a detection result of the inner sensor 3 (e.g. vehicle speed information from the vehicle speed sensor, acceleration information from the acceleration sensor, yaw rate information from the yaw rate sensor, etc.). The running state of the hybrid vehicle V includes, for example, a vehicle speed, acceleration, and a yaw rate.

The running plan generation unit 14 generates a course of the hybrid vehicle V, for example, on the basis of the target route arithmetically operated by the navigation system 5, the vehicle position recognized by the vehicle position recognition unit 11, and the external situation (including the vehicle position, direction or orientation) of the hybrid vehicle V recognized by the external situation recognition unit 12. The course is a track on which the hybrid vehicle V travels on the target route. The running plan generation unit 14 generates the course in such a manner that the hybrid vehicle V preferably runs on the target route in accordance with standards of safety, compliance, running efficiency, and the like. It is needless to say that at this time, the course of the hybrid vehicle V is generated to avoid a contact with the obstacles, on the basis of the situation of the obstacles in the surroundings of the hybrid vehicle V.

The running plan generation unit 14 generates a running plan according to the generated course. In other words, the running plan generation unit 14 generates the running plan in accordance with the target route set in advance, at least on the basis of the external situation, which is the information on the surroundings of the hybrid vehicle V and the map information from the map database 4. The running plan may be data indicating transition of the vehicle speed, acceleration, steering torque, or the like of the hybrid vehicle when the hybrid vehicle V runs on a road long the target route. The running plan may include a speed pattern, an acceleration/deceleration pattern, and a steering pattern of the hybrid vehicle V. The running plan generation unit 14 may generate the running plan to minimize a travel time (or a required time for the hybrid vehicle V to arrive at the destination).

The speed pattern is, for example, data including a target vehicle speed set in association with time for each target control position, with respect to the target control position set at predetermined intervals (e.g. at intervals of 1 m) on the course. The acceleration/deceleration pattern is, for example, data including target acceleration/deceleration set in association with time for each target control position, with respect to the target control position set at predetermined intervals (e.g. at intervals of 1 m) on the course. The steering pattern is, for example, data including target steering torque set in association with time for each target control position, with respect to the target control position set at predetermined intervals (e.g. at intervals of 1 m) on the course.

The running control unit 15 controls the running of the hybrid vehicle V in an automatic manner, on the basis of the running plan generated by the running plan generation unit 14. The running control unit 15 outputs a control signal according to the running plan, to each unit of the hybrid vehicle V. By this, the running control unit 15 controls the running of the hybrid vehicle V in such a manner that the hybrid vehicle V performs the automatic running in accordance with the running plan.

The engine start determination unit 16 is one specific example of the "start determining device", and determines whether or not to forcibly start the engine ENG during EV running (i.e. if the engine ENG is stopped and the running is performed only with power of the motor generator MG). The engine start determination unit 16 determines whether or not to start the engine ENG, on the basis of various parameters indicating a state of the hybrid vehicle V. An engine start inhibition control process performed by the engine start determination unit 16 will be detailed later.

The condition setting unit 17 is one specific example of the "setting device", and sets a condition regarding a surrounding environment situation inputted by the driver of the hybrid vehicle V for example, via the HMI 6 or the like (specifically a condition regarding a surrounding environment situation in which the driver does not want to start the engine ENG), as an engine start avoidance condition. The condition setting unit 17 stores the set engine start avoidance condition, for example, in a memory or the like.

The condition matching determination unit 18 is one specific example of the "condition determining device", and determines whether or not a current surrounding environment situation matches the engine start avoidance condition set by the condition setting unit 17. In the determination of the condition matching determination unit 18, information indicating a surrounding environment situation obtained to perform the automatic operation is used as the current surrounding environment situation. Specifically, the matching with the engine start avoidance condition is determined on the basis of the vehicle position of the hybrid vehicle V recognized by the vehicle position recognition unit 11, the external situation of the hybrid vehicle V recognized by the external situation recognition unit 12, and the running state of the hybrid vehicle V recognized by the running state recognition unit 13. As described above, the vehicle position recognition unit 11, the external situation recognition unit 12, and the running state recognition unit 13 function as one specific example of the "obtaining device".

The engine start control unit 19 is one specific example of the "controlling device", and changes ease of subsequent start of the engine ENG according to a determination result of the condition matching determination unit 18. Specifically, the engine start control unit 19 changes a determination threshold value of the engine start determination unit 16, in accordance with the determination result of the condition matching determination unit 18. A method of changing the determination threshold value by the engine start control unit 19 will be detailed later.

<Automatic Operation Control Process>

Figure 2:
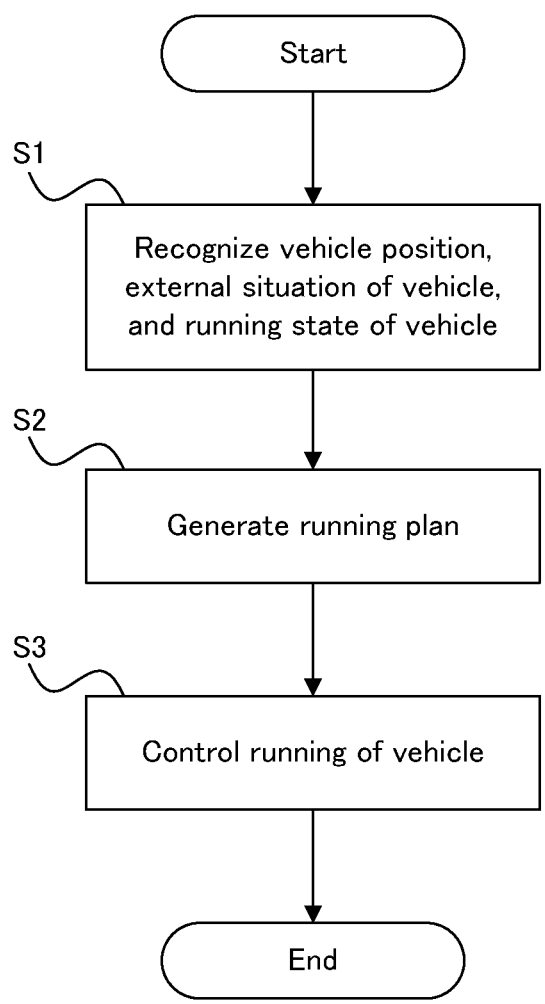
FIG. 2 is a flowchart illustrating an automatic running process performed by a control apparatus for the hybrid vehicle according to the embodiment.

Next, with reference to FIG. 2, an automatic operation control process performed by the ECU 10, which is the control apparatus for the hybrid vehicle according to the embodiment, will be explained. FIG. 2 is a flowchart illustrating an automatic running process performed by the control apparatus for the hybrid vehicle according to the embodiment.

In FIG. 2, for example, if the driver sets the destination in the navigation system 5 and performs the input operation to start the automatic operation on the HMI 6, the ECU 10 performs the following automatic running process, repeatedly in a predetermined period.

Firstly, the vehicle position of the hybrid vehicle V is recognized form the information on the position of the hybrid vehicle V received by the GPS reception unit 2 and the map information from the map database 4. Moreover, the external situation of the hybrid vehicle V is recognized by the external situation recognition unit 12 from the detection result of the outer sensor 1. Moreover, the running state of the hybrid vehicle is recognized by the running state recognition unit 13 from the detection result of the inner sensor 3 (step S1).

Then, the running plan of the hybrid vehicle V is generated by the running plan generation unit 14 from the target route of the navigation system 5, and the vehicle position, the external situation, and the running state of the hybrid vehicle V recognized by the step S1 (step S2).

Then, the running of the hybrid vehicle V is controlled by the running control unit 15 in such a manner that the hybrid vehicle V runs in accordance with the generated running plan (step S3). When the process in the step S3 is ended, it moves to the next-cycle automatic operation control process.

As a result of the automatic operation control process explained above, the automatic operation is ended when the hybrid vehicle V arrives at the destination. Alternatively, the automatic operation is ended even if the input operation for stopping the automatic operation is performed by the driver on the HMI 6 during the automatic operation control process.

<Engine Forced Start Control Process>

Figure 3:
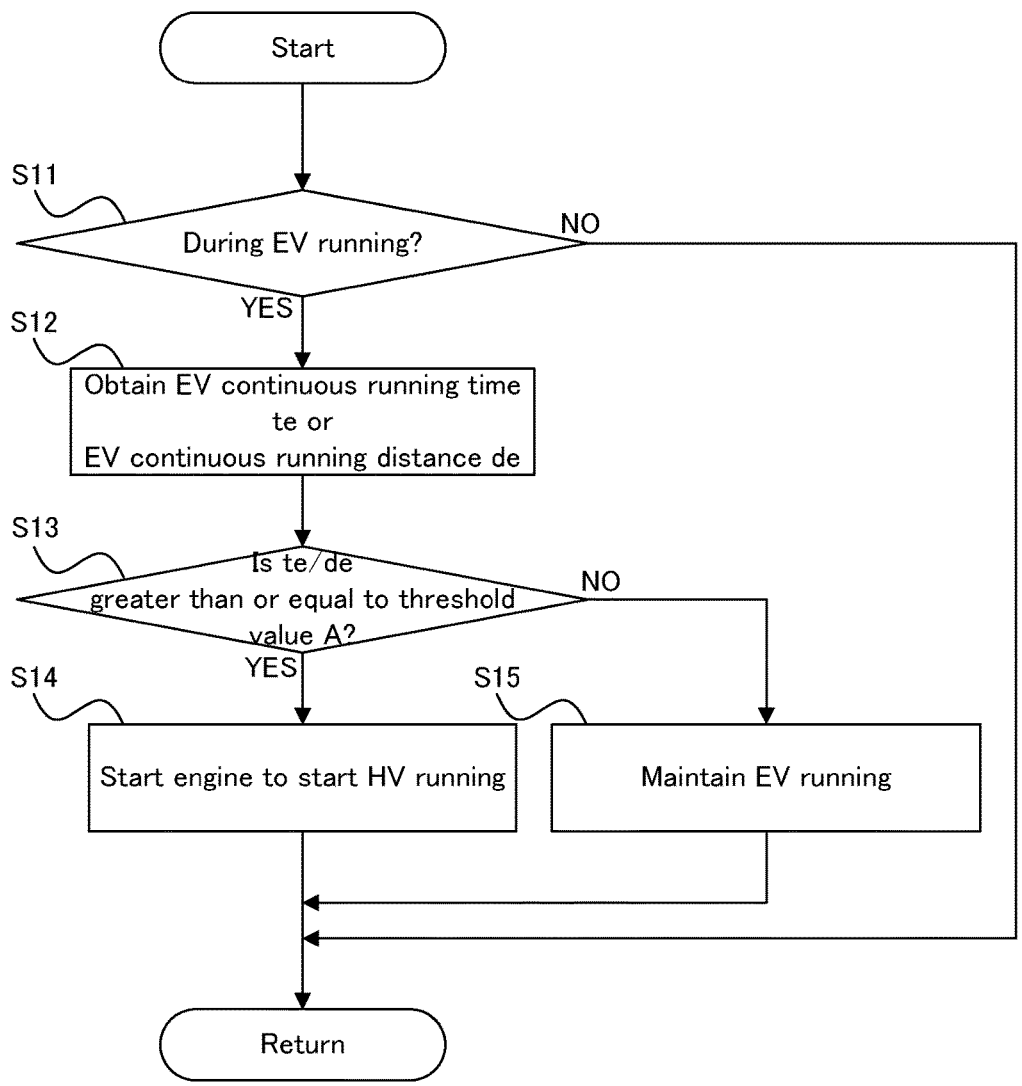
FIG. 3 is a flowchart illustrating an engine forced start control process regarding a lubrication condition of a transaxle.
Figure 4:
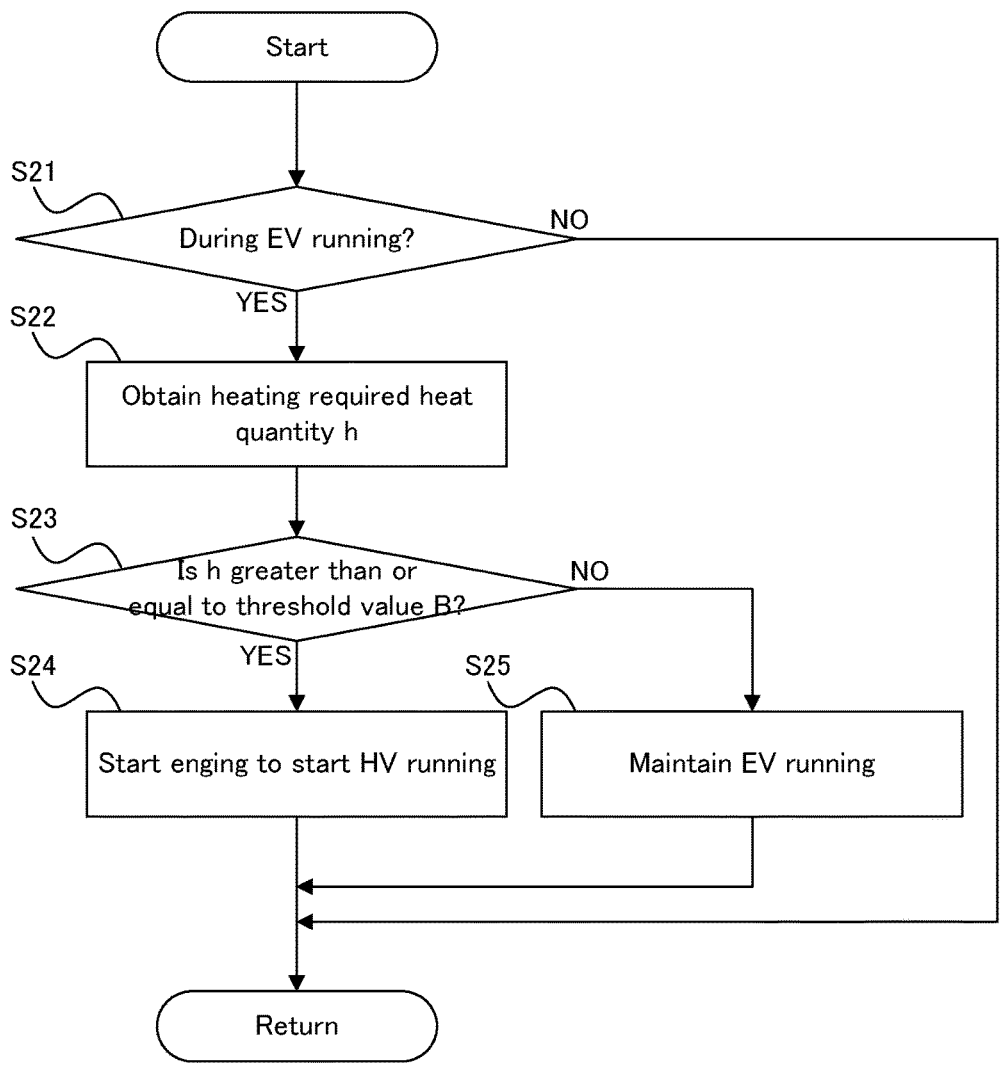
FIG. 4 is a flowchart illustrating an engine forced start control process regarding a heating requirement.

Next, with reference to FIG. 3 and FIG. 4, a forced start control process of the engine ENG during the automatic operation will be explained. FIG. 3 is a flowchart illustrating an engine forced start control process regarding a lubrication condition of a transaxle. FIG. 4 is a flowchart illustrating the engine forced start control process regarding a heating requirement.

In FIG. 3, on the engine start determination unit 16, if the hybrid vehicle V is performing the EV running (step S11: YES), an EV continuous running time to or an EV continuous running distance de are obtained (step S12). The EV continuous running time te is a total time elapsed from the start of the current EV running, and is equal to a time for which the engine ENG is stopped and the running is performed. The EV continuous running distance de is a total distance of the running from the start of the current EV running, and is equal to a distance in which the engine ENG is stopped and the running is performed. The EV continuous running time te and the EV continuous running distance de are one specific example of the "predetermined parameter".

Then, on the engine start determination unit 16, it is determined whether or not the obtained EV continuous running time te or the obtained EV continuous running distance de is greater than or equal to a predetermined threshold value A (step S13). The threshold value A is one specific example of the "determination threshold value", and is set in advance to determine whether or not to start the engine ENG on the basis of the lubrication condition of the transaxle. The threshold value A is set as a time threshold value if the EV continuous running time te is obtained. The threshold value A is set as a distance threshold value if the EV continuous running distance de is obtained.

If it is determined that the EV continuous running time te or the EV continuous running distance de is greater than or equal to the predetermined threshold value A (the step S13: YES), the engine ENG is forcibly started and the running is changed to HV running (step S14). On the other hand, if it is determined that the EV continuous running time te or the EV continuous running distance de is not greater than or equal to the predetermined threshold value A (the step S13: NO), the engine ENG is not started, and the EV running is maintained (step S15).

Particularly here, the hybrid vehicle V according to the embodiment has a function of positively lubricating lubricant oil of the transaxle only if the engine ENG is operated. Thus, if a state is maintained in which the engine ENG is not started for a long time or in a long distance, the lubricating function of the transaxle is reduced, which possibly causes an unexpected detrimental effect in the hybrid vehicle V.

In contrast, the engine start determination unit 16 determines to forcibly start the engine ENG if the EV continuous running time to or the EV continuous running distance de is greater than or equal to the predetermined threshold value A. It is thus possible to preferably avoid the detrimental effect caused by the lubrication condition of the transaxle.

In FIG. 4, on the engine start determination unit 16, if the hybrid vehicle V is performing the EV running (step S21: YES), a heating requirement heat quantity h is obtained, which is a heat quantity required to normally operate a heater in an interior of the hybrid vehicle V (step S22). The heating requirement heat quantity h is one specific example of the "predetermined parameter".

Then, on the engine start determination unit 16, it is determined whether or not the obtained heating requirement heat quantity h is greater than or equal to a predetermined threshold value B (step S23). The threshold value B is one specific example, and is set in advance to determine whether or not to start the engine ENG on the basis of a heating requirement condition.

If it is determined that the heating requirement heat quantity h is greater than or equal to the predetermined threshold value B (the step S23: YES), the engine ENG is forcibly started and the running is changed to the HV running (step S24). On the other hand, if it is determined that the heating requirement heat quantity h is not greater than or equal to the predetermined threshold value B (the step S23: NO), the engine ENG is not started, and the EV running is maintained (step S25).

Particularly here, the hybrid vehicle V according to the embodiment uses an exhaust heat of the engine ENG as a heat source of the heater in the vehicle interior. Thus, if the engine ENG is not started, a heat quantity that satisfies the heating requirement is not obtained, which possibly causes an unexpected detrimental effect in the hybrid vehicle V.

In contrast, the engine start determination unit 16 determines to forcibly start the engine ENG if the heating requirement heat quantity h is greater than or equal to the predetermined threshold value B. It is thus possible to preferably avoid the detrimental effect caused by the lubrication condition of the heating requirement condition.

The parameter used by the engine start determination unit 16 for the determination is not limited to the EV continuous running time to or the EV continuous running distance de and the heating requirement heat quantity h. In other words, any parameter that allows the determination of a detrimental effect caused by not starting the engine ENG can be used to determine whether or not to start the engine.

In the embodiment, the threshold value A and the threshold value B used for the aforementioned determination process can be changed. A specific method of changing the threshold value A and the threshold value B will be explained in detail below.

<Engine Start Inhibition Control Process>

Figure 5:
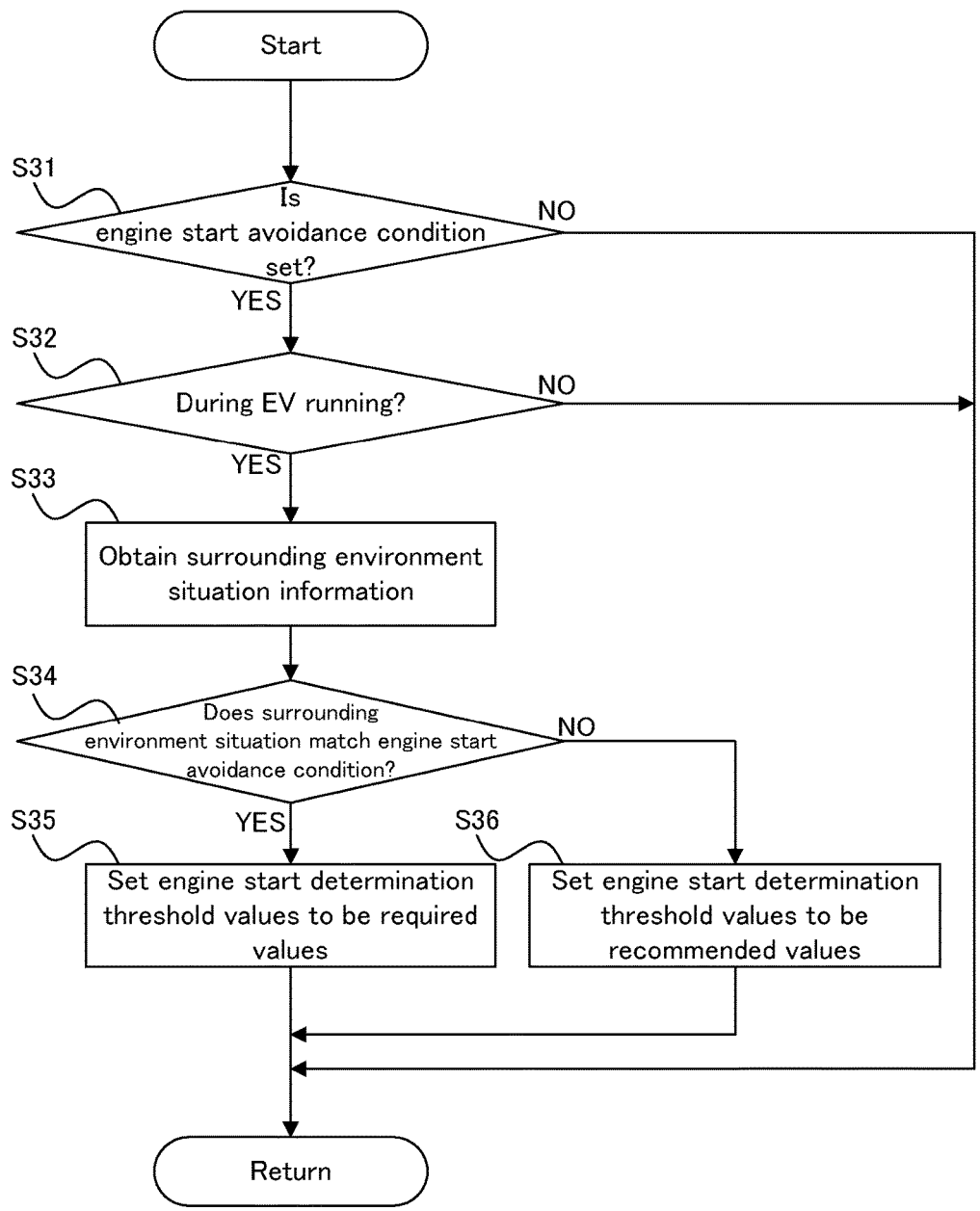
FIG. 5 is a flowchart illustrating an engine start inhibition control process performed by the control apparatus for the hybrid vehicle according to the embodiment.

Next, with reference to FIG. 5, the engine start inhibition control process will be explained in detail. FIG. 5 is a flowchart illustrating the engine start inhibition control process performed by the control apparatus for the hybrid vehicle according to the embodiment.

In FIG. 5, if the engine start inhibition control process is started, it is firstly determined whether or not the engine start avoidance condition is set on the condition setting unit 17 (step S31). If the engine start avoidance condition is not set (the step S31: NO), the subsequent process is omitted, and a series of process operations is ended.

In FIG. 5, if the engine start avoidance condition is set (the step S31: YES), it is determined whether or not the hybrid vehicle V is performing the EV running (step S32). Even if it is determined that the hybrid vehicle V is not performing the EV running (the step S32: NO), the subsequent process is omitted, and a series of process operations is ended.

If it is determined that the hybrid vehicle V is performing the EV running (the step S32: YES), surrounding environment situation information for performing the automatic operation is obtained (step S33). Specifically, the vehicle position of the hybrid vehicle V recognized by the vehicle position recognition unit 11, the external situation of the hybrid vehicle V recognized by the external situation recognition unit 12, and the running state of the hybrid vehicle V recognized by the running state recognition unit 13 are individually obtained.

If the surrounding environment situation information is obtained, it is determined by the condition matching determination unit 18 whether or not the current surrounding environment situation indicated by the surrounding environment situation information matches the engine start avoidance condition set by the condition setting unit 17 (step S34). Hereinafter, the determination of the matching with the engine start avoidance condition will be explained in detail with a plurality of specific examples.

As the engine start avoidance condition, presence of pedestrians can be set. For example, if there are the pedestrians in the surroundings of the hybrid vehicle V, the driver who does not want to start the engine ENG can specify a situation in which there are Y pedestrians in a range of X meters from the hybrid vehicle V, and the driver can set the situation as the engine start avoidance condition, wherein X and Y are numerical values that can be arbitrarily changed.

In this case, during running of the hybrid vehicle V, the surrounding environment situation information stored in advance (e.g. map data stored by the map database 4) and the current surrounding environment situation information (e.g. the information obtained by the outer sensor 1, the GPS reception unit 2, and the inner sensor 3 or the like) are compared, and as a result, the pedestrians in the surroundings of the hybrid vehicle V are detected. Specifically, the information on obstacles, such as the pedestrians, can be detected by calculating a difference between the surrounding environment situation information stored in advance and the current surrounding environment situation information. Then, if an obstacle having a size of a human and having a behavior similar to a human's behavior is extracted from the detected obstacles, the pedestrian can be accurately detected.

If the pedestrians who are in the surroundings of the hybrid vehicle V can be detected, it is possible to easily determine whether or not the surrounding environment situation matches the engine start avoidance condition.

As the engine start avoidance condition, a place in which the hybrid vehicle V possibly runs can be set. For example, the driver can set the engine start avoidance condition only by inputting coordinates indicating a particular place. Not only a pin-point place but also an area with a certain degree of range (e.g. an area in a range of X meters from the particular place, etc.) can be also set as the engine start avoidance condition. Moreover, if places that are off the road and that have buildings are collectively specified, the engine start avoidance condition can be set, for example, on the assumption that the hybrid vehicle runs in a building such as a multistory parking space.

In this case, it is determined whether the surrounding environment situation matches the engine start avoidance condition, for example, on the basis of the surrounding environment situation information indicating the position of the hybrid vehicle V recognized by the vehicle position recognition unit 11.

As the engine start avoidance condition, a time zone in which the hybrid vehicle V runs can be set. For example, the driver can set the engine start avoidance condition by specifying a start time and an end time of a time zone in which the driver does not want to start the engine ENG (e.g. early in the morning or late at night).

In this case, it is determined whether or not the surrounding environment situation matches the engine start avoidance condition, for example, on the basis of the surrounding environment situation information indicating a current time point.

As the engine start avoidance condition, a road width of a road on which the hybrid vehicle V runs can be set. For example, the driver can set the engine start avoidance condition by specifying a range of the road width according to an environment in which the driver does not want to start the engine ENG (e.g. a residential area, etc.).

In this case, it is determined whether or not the surrounding environment situation matches the engine start avoidance condition, on the basis of the surrounding environment situation information indicating the road width of a road on which the hybrid vehicle V is running.

The aforementioned information on the pedestrians, the places, the time zone, and the road width can be combined with each other, and can be set as the engine start avoidance condition. This makes it possible to set a more complicated condition, such as, for example, in a case where the hybrid vehicle V runs around the driver's house early in the morning.

Back in FIG. 5, if it is determined that the surrounding environment situation does not match the engine start avoidance condition (the step S34: NO), the engine start control unit 19 respectively sets the threshold values A and B used on the engine start determination unit 16 to be A1 and B1, which are recommended values (step S36).

The recommended values A1 and B1 are determination threshold values corresponding to a situation in which it is recommended to start the engine ENG because not starting the engine ENG may cause the detrimental effect even though it is less likely. Thus, if the recommended values A1 and B1 are used when the surrounding environment situation does not match the engine start avoidance condition, it is possible to effectively suppress the detrimental effect caused by not starting the engine ENG.

On the other hand, if it is determined that the surrounding environment situation matches the engine start avoidance condition (the step S34: YES), the engine start control unit 19 respectively sets the threshold values A and B used on the engine start determination unit 16 to be A2 and B2, which are required values (step S35).

The required values A2 and B2 are determination threshold values corresponding to a situation in which it is required to start the engine ENG because not starting the engine ENG highly likely causes the detrimental effect. Thus, if the recommended values A1 and B1 are used when the surrounding environment situation matches the engine start avoidance condition, it is possible to minimize the detrimental effect caused by not starting the engine ENG.

If it is determined that the surrounding environment situation matches the engine start avoidance condition, the start of the engine may be completely prohibited. In this case, the engine ENG is not started, and it is thus possible to certainly prevent an engine start sound from being generated.

As explained above, according to the control apparatus for the hybrid vehicle in the embodiment, various data used for the automatic operation is used to determine whether or not the surrounding environment situation matches the condition for avoiding the start of the engine ENG. It is thus possible to preferably control the start of the engine ENG of the hybrid vehicle V in automatic operation.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A control apparatus for a hybrid vehicle wherein the hybrid vehicle includes an internal combustion engine and an electric motor as a power source, and the hybrid vehicle can realize an automatic operation mode that allows autonomous running without any input by a driver, said control apparatus comprising:
    a setting device configured to set a surrounding environment situation in which the driver does not want to start the internal combustion engine, as an internal combustion engine start avoidance condition in advance;
    an obtaining device configured to obtain surrounding environment situation information detected by an outer sensor in order that the hybrid vehicle performs the autonomous running in the automatic operation mode;
    a condition determining device configured to determine whether or not the surrounding environment situation information obtained by said obtaining device matches the internal combustion engine start avoidance condition set by said setting device; and
    a controlling device configured to control the internal combustion engine to be started less often in a case where it is determined that the surrounding environment situation information matches the internal combustion engine start avoidance condition, than in a case where it is determined that the surrounding environment situation information does not match the internal combustion engine start avoidance condition.

2. The control apparatus for the hybrid vehicle according to claim 1, wherein
    said setting device can set presence of pedestrians in surroundings of the hybrid vehicle, as the internal combustion engine start avoidance condition, and
    said obtaining device detects pedestrians in the surroundings of the hybrid vehicle by comparing the surrounding environment situation information stored in advance and the surrounding environment situation information at a current time, and obtains a detection result as the surrounding environment situation information.

3. The control apparatus for the hybrid vehicle according to claim 1, wherein
    said control apparatus comprises a start determining device configured to determine whether or not to start the internal combustion engine, in accordance with whether a predetermined parameter of the hybrid vehicle exceeds a determination threshold value, and
    said controlling device controls said start determining device (i) to use a first threshold value as the determination threshold value if it is determined that the surrounding environment situation information obtained by said obtaining device does not match the internal combustion engine start avoidance condition, and (ii) to use a second threshold value, which causes the internal combustion engine to be started less often than using the first threshold value, as the determination threshold value, if it is determined that the surrounding environment situation information obtained by said obtaining device matches the internal combustion engine start avoidance condition.

4. The control apparatus for the hybrid vehicle according to claim 3, wherein said start determining device determines whether or not to start the internal combustion engine by using as the predetermined parameter a period or a distance in which the hybrid vehicle runs with the internal combustion engine stopped, in order to lubricate lubricant oil of a transaxle of the hybrid vehicle.

5. The control apparatus for the hybrid vehicle according to claim 3, wherein said start determining device determines whether or not to start the internal combustion engine by using as the predetermined parameter a heat quantity required for a heater of the hybrid vehicle.

* * * * *